(12) United States Patent
Ikenoue et al.

(10) Patent No.: US 9,047,320 B2
(45) Date of Patent: Jun. 2, 2015

(54) MUSIC RECOMMENDATION SYSTEM, INFORMATION PROCESSING DEVICE, AND INFORMATION PROCESSING METHOD

(75) Inventors: Shoichi Ikenoue, Tokyo (JP); Takayuki Sakamoto, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 379 days.

(21) Appl. No.: 13/513,418

(22) PCT Filed: Sep. 6, 2010

(86) PCT No.: PCT/JP2010/005468
§ 371 (c)(1),
(2), (4) Date: Jun. 1, 2012

(87) PCT Pub. No.: WO2011/067880
PCT Pub. Date: Jun. 9, 2011

(65) Prior Publication Data
US 2012/0237090 A1 Sep. 20, 2012

(30) Foreign Application Priority Data
Dec. 4, 2009 (JP) ................................ 2009-275990

(51) Int. Cl.
*G06K 9/00* (2006.01)
*G06F 17/30* (2006.01)
(52) U.S. Cl.
CPC .... *G06F 17/30256* (2013.01); *G06F 17/30749* (2013.01)
(58) Field of Classification Search
CPC ............................................... G06F 17/30749
See application file for complete search history.

(56) References Cited

U.S. PATENT DOCUMENTS

2003/0069893 A1 4/2003 Kanai et al.
2005/0259949 A1 11/2005 Habuta et al.

FOREIGN PATENT DOCUMENTS

| CN | 1378156 | 11/2002 |
|---|---|---|
| JP | 2001-92853 | 4/2001 |
| JP | 2001-282813 | 10/2001 |

(Continued)

OTHER PUBLICATIONS

International Search Report dated Oct. 5, 2010, from corresponding International Application No. PCT/JP2010/005468.

(Continued)

*Primary Examiner* — Stephen R Koziol
*Assistant Examiner* — Amandeep Saini
(74) *Attorney, Agent, or Firm* — Katten Muchin Rosenman LLP (57) ABSTRACT

A photograph classification unit classifies the photographs for each scene in a music-feature information determination unit. A photograph feature acquisition unit identifies a feature of the photograph based on additional information of the photograph and a result of face recognition of the image. A tempo determination unit determines a tempo of music based on a time zone of image capturing, a range of the number of people captured in a photograph, the degree of smile, activities, etc. A melody determination unit determines information that confines a title, a feature value, a genre, etc., based on an event, a time zone, and a season at the time of image capturing, a city and a country in which the image capturing has occurred, etc. Based on the determined feature of the music, a music data output unit extracts and then presents matching music.

13 Claims, 6 Drawing Sheets

(56) References Cited

FOREIGN PATENT DOCUMENTS

| | | |
|---|---|---|
| JP | 2005-242833 | 9/2005 |
| JP | 2005-341511 | 12/2005 |
| JP | 2006-350592 | 12/2006 |
| JP | 2007-79867 | 3/2007 |
| JP | 2007-206921 | 8/2007 |
| JP | 2008-275936 | 11/2008 |
| JP | 2009-55620 | 3/2009 |
| JP | 2009-266005 | 11/2009 |
| WO | 2006/106825 | 10/2006 |

OTHER PUBLICATIONS

International Preliminary Report on Patentability and Written Opinion of the International Search Authority dated Jul. 10, 2012, from corresponding International Application No. PCT/JP2010/005468.
Chinese Office Action dated Jun. 5, 2013, from corresponding Chinese Application No. 201080054534.2.
Notification of Reason(s) for Refusal dated Oct. 29, 2013, from corresponding Japanese Application No. 2009-275990.
Notification of Reason(s) for Refusal dated Jul. 9, 2013, from corresponding Japanese Application No. 2009-275990.
Supplementary European Search Report dated Sep. 5, 2013, from corresponding European Application No. 10834336.9-1952.

MUSIC RECOMMENDATION SYSTEM, INFORMATION PROCESSING DEVICE, AND INFORMATION PROCESSING METHOD

TECHNICAL FIELD

The present invention relates to information processing techniques, and in particular to a system for recommending music to a user, an information processing device, and an information processing method performed therein.

BACKGROUND ART

In recent years, with a growing use of image-capturing devices such as digital cameras, a development of image processing techniques, and the like, there has been an increase in opportunities for users to enjoy captured images such as photographs at home, during meetings, etc., using personal computers or reproducing devices. In this case, by playing the images and BGM (Back Ground Music) at the same time, attractive effects can be realized even with an image of a photograph or the like that does not come with music data. As such an embodiment, a technique has been suggested for adjusting, when reproducing a plurality of photographs in a slide show format where the photographs are switched at a predetermined time interval for display, the reproduction time of music selected by the user in line with the reproduction time of the photographs so as to reproduce the music as BGM (see, for example, patent document No. 1).

As described, when using, as BGM, music created separately from an image, scenes and feelings at the time of image capturing can be effectively conveyed to a viewer by selecting music that best matches the atmosphere of a photograph. A technique for matching the image capturing date of a photograph with the release date of music has been suggested as a technique for associating a photograph and music (see, for example, patent document No. 2).

[patent document No. 1] Japanese Patent Application (Laid-Open) No. 2009-55620

[Patent Document No. 2] Japanese Patent Application Publication No. 2008-275936

SUMMARY OF THE INVENTION

Problem to be Solved by the Invention

Making an association based on the data, as described above, is effective in a limited situation where one cherishes times gone by. However, it cannot be said that music being selected matches an individual scene recorded in a photograph. Selecting matching music for each scene of a photograph based on own memory is a time-consuming work for a user and also requires a broad knowledge of music.

In this background, a purpose of the present invention is to provide an information processing technique capable of recommending music that matches the atmosphere of content.

Means to Solve the Problem

One embodiment of the present invention relates to an information processing apparatus. The information processing device comprises: a content feature acquisition unit configured to acquire, based on additional information of content to be processed, a feature of the content; a music feature determination unit configured to determine, in reference to a table prepared in advance associating the feature of the content with a feature of music, the feature of the music based on the feature of the content; and a music data output unit configured to detect music that has the feature of the said music from a database and to present the information thereof as recommended music that matches the content, wherein the content feature acquisition unit acquires, as the feature of the content, a recording location based on information regarding a geographic position of recording of the content, and wherein the music feature determination unit determines the feature of the music based on the recording location.

The content may be any one set of data that can be recorded and reproduced using electronic devices or information technology devices, e.g., image data such as a photograph, a moving image, computer graphics, a computerized hand-drawn picture, text data of a memo, a poem, or the like, or audio data recorded by a voice recorder or a recording device, or any combinations of these described sets of data.

Another embodiment of the present invention relates to a music recommendation system. The music recommendation system is for acquiring information pertaining to recommended music from a server via a network in an information processing device, wherein the information processing device comprises: a content feature acquisition unit configured to acquire, based on additional information of content to be processed, a feature of the content; a music feature determination unit configured to determine, in reference to a table prepared in advance associating the feature of the content with a feature of music, the feature of the music based on the feature of the content; and a music data output unit configured to transmit the feature of the music to the server so as to request recommendation of music that matches the content and to acquire information pertaining to recommended music from the server so as to present the acquired information, wherein the server comprises: a music data output unit configured to detect, from a database, music that has the feature of the music transmitted from the information processing device and to transmit the information thereof as recommended music to the information processing device, wherein the content feature acquisition unit acquires, as the feature of the content, a recording location based on information regarding a geographic recording position of the content, and wherein the music feature determination unit determines the feature of the music based on the recording location.

Yet another embodiment of the present invention relates to an information processing method. The information processing method comprises: reading out additional information of content to be processed and then acquiring a feature of the content based on additional information; determining, in reference to a table prepared in advance associating the feature of the content with a feature of music, the feature of the music based on the feature of the content; and detecting music that has the feature of said music from a database and then presenting the information thereof as recommended music that matches the content, wherein, in the acquiring of the feature of the content, a recording location is acquired based on information regarding a geographic recording position as the feature of the content, and wherein, in the determining of the feature of the music, the feature of the music is determined based on the recording location Optional combinations of the aforementioned constituting elements, and implementations of the invention in the form of methods, apparatuses, systems, computer programs, and recording media recording computer programs may also be practiced as additional modes of the present invention.

Advantage of the Present Invention

According to the present invention, information of music that matches the atmosphere of content can be easily obtained.

BEST MODE FOR CARRYING OUT THE INVENTION

Figure 1:
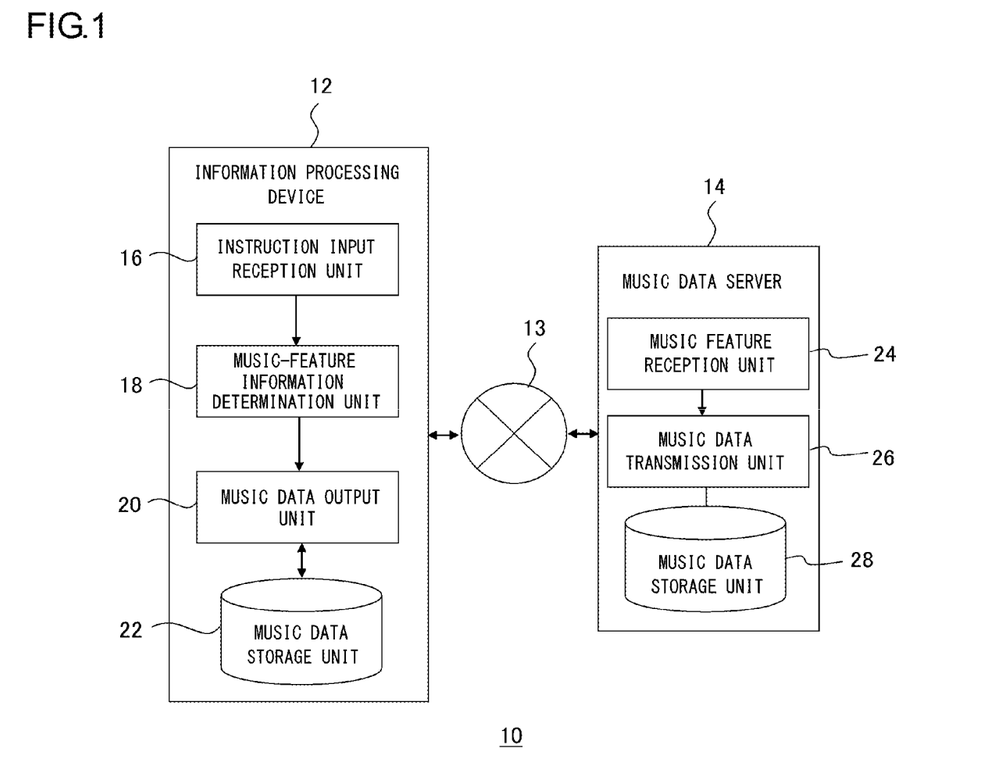
FIG. 1 is a diagram illustrating the configuration of a music recommendation system according to the embodiment.

FIG. 1 illustrates the configuration of a music recommendation system according to the embodiment. A music recommendation system 10 comprises an information processing device 12 operated by a user and a music data server 14 connected to the information processing device 12 via a network 13. The information processing device 12 is an information device such as a personal computer, a recording/reproducing device, a portable phone, or the like that is operated by the user. The information processing device 12 comprises: an instruction input reception unit 16 for receiving an instruction input from the user; a music-feature information determination unit 18 for determining the feature of music recommended based on the feature of a photograph; a music data output unit 20 for outputting information on music having a determined feature; and a music data storage unit 22 associating a feature of music with individual music.

The instruction input reception unit 16 is an input device that receives from the user an input of necessary information such as a file name of the data of a captured photograph and a music recommendation instruction. The instruction input reception unit 16 may be a commonly-used input device such as a keyboard, a button, a touch panel, and a mouse. The music-feature information determination unit 18 analyzes a photograph specified by the user, extracts a feature of the photograph, and then derives a feature of music that matches the extracted feature. If the specified photograph constitutes a group of photographs captured over a long period of time during a trip, wedding, or the like, a feature of music is determined for each scene thereof.

In extracting the feature of the photograph, the music-feature information determination unit 18 extracts additional information of the photograph and also extracts information from the image of the photograph itself. Recently, it is a common practice to record various types of information at the same time a photograph is captured. In the embodiment, an image-capturing date and time and an image-capturing position are particularly included in the additional information of the photograph. Temporal information indicating whether the date falls on a special day such as Christmas, New Years, etc., as well as the season, a time zone of a single day, etc., is derived as a feature of the photograph based on the image-capturing date and time. Positional information indicating a city, a country, or the like where the image capturing has occurred is derived as a feature of the photograph based on the geographic position of the image-capturing, i.e., information regarding positional coordinates such as latitude and longitude. Furthermore, the image-capturing position is also used for correcting the aforementioned temporal information.

In other words, when visiting a region with a time difference, an image-capturing date and time recorded on the time set in an image-capturing device such as a camera are corrected to the local time based on the information regarding an image-capturing position so that suitable music is accurately recommended without adjusting the time set in the image-capturing device to match the local time. Even for trips in Christmas time, the seasons are reversed between the northern and southern hemispheres. Thus, it is not always true that mellow music to accompany falling snow matches Christmas photographs. Depending on a location, a sense of the season is completely different even for photographs taken on the same date. As described, in consideration of the fact that suitable music and a sense of the season are different depending on a region, a feature of a photograph is correctly identified by comprehensively evaluating an image-capturing date and time and an image-capturing position so as to recommend matching music in the embodiment.

The music-feature information determination unit 18 may search for a server (not shown) connected via a network and acquire predetermined information corresponding to the image-capturing position and the image-capturing date and time. For example, the music-feature information determination unit 18 may acquire the weather, the atmospheric temperature, the time at which the sun or moon comes out or goes in, the constellation, the amount of cedar pollen, or the amount of yellow sand at the time of the image capturing, surrounding photographs provided by a server that provides surrounding photographs based on the position information, the number of surrounding photographs provided, or the like.

Further, the music-feature information determination unit 18 performs a face recognition process on the image of a photograph and acquires, as features of the photograph, information indicating whether there is any image of a person, how many people are captured, and the degree of smile. Further, attributes of a person such as race, sex, age, and the like may be acquired, or these attributed may be combined. These features can be acquired by a commonly-used technique for recognizing a face and facial expressions based on pattern matching, relative positions of feature points, or the like in an image processing technique. A feature such as a tempo of music is also determined based on these features. Other than a face recognition process, at least any one of the following: brightness distribution; color distribution; and frequency characteristics, is acquired by performing commonly-used image analysis, and a feature of music may be determined based on the brightness, color tone, etc.

The music data output unit 20 extracts music having the feature derived by the music-feature information determination unit 18 from the music data storage unit 22 and outputs information related to the music. In this case, bibliographic information such as the title, lyrics, and artist of the music may be merely displayed as character information. Alternatively, the music may be actually reproduced in addition to the display of the character information. Alternatively, for example, a single music file may be created in which audio data sets of recommended music for respective scenes are arranged in chronological order of the scenes Therefore, the music data storage unit 22 stores the data of music in a format of data in which a feature of the music and the bibliographic information of the music are associated, data in which the feature of the music and audio data are associated, audio data in which the feature and bibliographic information of the music are added as metadata, or the like.

The "feature of the music" may be any one of parameters that can characterize the music such as an instrumental sound, the sex of voice, a mood, acoustic quality, sound pressure, a tempo, the quality of a sound, a music structure, etc., in addition to bibliographic information such as a title, lyrics, an artist, a genre, a year of release, etc., or any combinations of these parameters. Alternatively, the feature of the music may be a classification identification number or the like that is obtained when similarity of music is evaluated based on a combination of these parameters and then classified in a detailed manner. The music-feature information determination unit 18 derives the feature of the music in a format that complies with the feature of the music that is linked to the music in the music data storage unit 22. In a specific example described later, it is assumed that the atmosphere of music such as "soothing," "calm," or the like in addition to the bibliographic information is connected to audio data of each music item as a feature value of the music.

The music data server 14 comprises a music feature reception unit 24 for receiving a feature of music desired to be recommended from the information processing device 12, a music data transmission unit 26 for transmitting information on music having the feature to the information processing device 12, and a music data storage unit 28 for associating a feature of music with individual music. The music data transmission unit 26 and the music data storage unit 28 of the music data server 14 have the same functions as those of the music data output unit 20 and the music data storage unit 22 of the information processing device 12, respectively.

The amount of information stored by the music data storage unit 28 of the music data server 14 can be increased compared to the amount of information stored by the music data storage unit 22 of the information processing device 12. The user includes, in an instruction for the instruction input reception unit 16, information indicating whether recommended music is desired to be obtained from among music sets stored in the information processing device 12 or whether recommended music including unknown music or music whose data is not yet possessed is desired to be obtained from the music data server 14. Accordingly, the music data output unit 20 of the information processing device 12 determines whether to extract recommended music by itself according to the feature derived by the music-feature information determination unit 18 or to request extraction of music by transmitting the feature to the music data server 14.

When classification of a feature derived by the music-feature information determination unit 18 is to be classification of a feature that is unique to the music data server 14, which is different from a feature added to music data as metadata and that is distributed generally, the music data output unit 20 may always request the music data server 14 to extract music. For example, the music data server 14 requested to extract music first transmits only bibliographic information such as a title and the like to the information processing device 12 after the extraction of recommended music and then transmits, only when the user requests a download, audio data of appropriate music to the information processing device 12.

With this, a proper billing process is carried out for the transmission of audio data. Both a music search process in which a feature of music is used as a search key and an information transmission process that follows in the music data server 14 are the same as those in a music search engine that has been put to practical use. The same applies to a search process in the music data output unit 20 of the information processing device 12. Therefore, an explanation is hereinafter given of the present embodiment focusing on the operation of the music-feature information determination unit 18. This explanation is given regarding an embodiment where music is recommended for a photograph. Frames that constitute a moving image or the like can be treated in a similar manner as long as the frames or the like have data from which similar additional information can be obtained.

Figure 2:
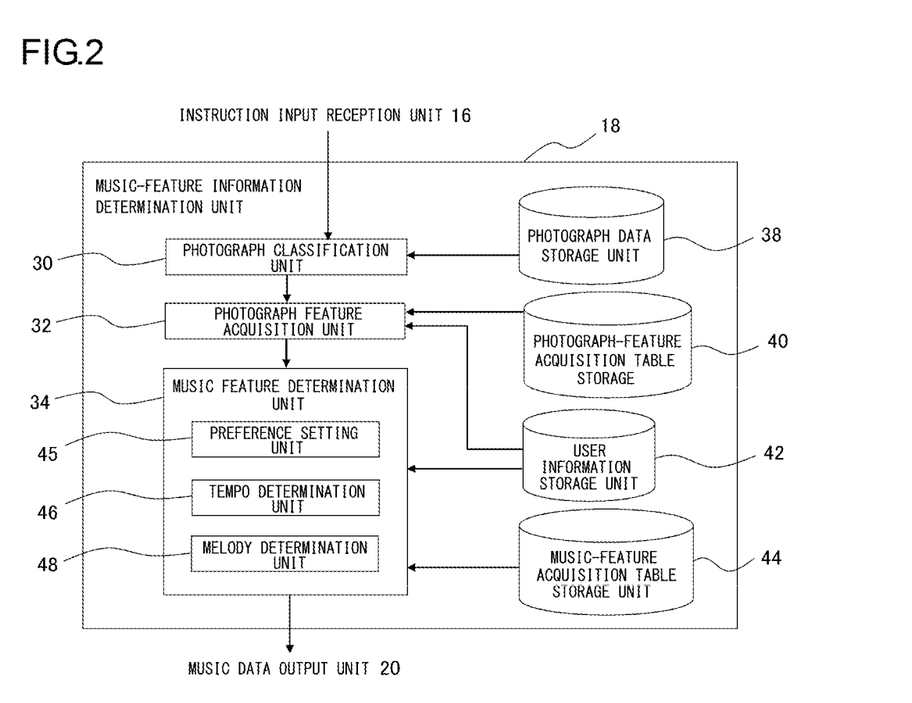
FIG. 2 is a diagram illustrating a detailed configuration of a music-feature information determination unit according to the embodiment.

FIG. 2 illustrates the configuration of the music-feature information determination unit 18 in detail. The music-feature information determination unit 18 comprises a photograph classification unit 30 for classifying, when there are a plurality of photographs to be processes, the photographs according to a scene, a photograph feature acquisition unit 32 for acquiring a feature of a photograph based on a classification or for a single photograph, and a music feature determination unit 34 for determining a feature of music to be recommended based on the feature of the photograph.

The music-feature information determination unit 18 further comprises a photograph data storage unit 38 for storing image data of a photograph along with additional information, a photograph-feature acquisition table storage unit 40 for storing a photograph-feature acquisition table associating the additional information and the content of the image of the photograph with the feature of the photograph, a user information storage unit 42 for storing user's personal information, and a music-feature acquisition table storage unit 44 for storing a music-feature acquisition table associating the feature of the photograph with the feature of the music to be recommended. Information stored in the photograph data storage unit 38 and the user information storage unit 42 is created by the user. The respective tables stored in the photograph-feature acquisition table storage unit 40 and the music-feature acquisition table storage unit 44 are set in advance at the time of manufacturing the device. Alternatively, it may be ensured that the tables can be modified by the user as necessary.

If the data of a photograph specified by the user is composed of data of a plurality of photographs, the photograph classification unit 30 classifies the photographs. When a plurality of photographs are to be processed, BGM selection for when the user displays the photographs in a slide show format is considered to be a purpose. In this case, music may be recommended for each one of the photographs or for all the plurality of photographs with different scenes or for each scene. Therefore, photographs are classified based on the image-capturing time and position, and music is recommended using each classification as one scene. When there is one photograph to be processed, the photograph classification unit 30 may not operate.

For a photograph classification or a single photograph to be processed, the photograph feature acquisition unit 32 identifies a feature of the photograph based on the additional information of the photograph and a feature of the image or a result of the face recognition. Therefore, in the photograph-feature acquisition table storage unit 40, a photograph-feature acquisition table is stored in advance for converting information that is directly obtained from the additional information of the photograph and the result of face recognition into an item prepared in advance as a feature of the photograph. When identifying a feature of the photograph, personal information stored in the user information storage unit 42 is also used. Specific examples are described later.

The music feature determination unit 34 comprises a preference setting unit 45 for setting an attribute of music that matches a user's preference, a tempo determination unit 46 for determining a tempo that matches a feature of a photograph, and a melody determination unit 48 for extracting a melody that matches the feature of the photograph. The attribute that matches the user's preference is, for example, a genre, a date, an artist, or the like of the music, and the attribute input when the user uses this function for the first time is stored in the user information storage unit 42. Alternatively, the attribute may be specified in accordance with a photograph every time the user gives an instruction to recommend music to the instruction input reception unit 16.

The tempo determination unit 46 determines a tempo of music based on a time zone of image capturing, a range of the number of people captured in a photograph, the degree of smile, an activity, an attribute of a person, weather and climate, time at which the sun or moon comes out or goes in, etc. The melody determination unit 48 determines information that confines a title, a feature value, a genre, etc., based on at least any one of the following: an event; a time zone; and the season at the time of image capturing; a city and a country in which the image capturing has occurred; weather and climate; time at which the sun or moon comes out or goes in; etc. Therefore, in the music-feature acquisition table storage unit 44, a music-feature acquisition table is stored in advance for converting a feature of a photograph by the tempo determination unit 46 and the melody determination unit 48 into an item for determining a range of a tempo and a melody, which is prepared in advance as a feature of music. Specific examples are described later.

Figure 3:
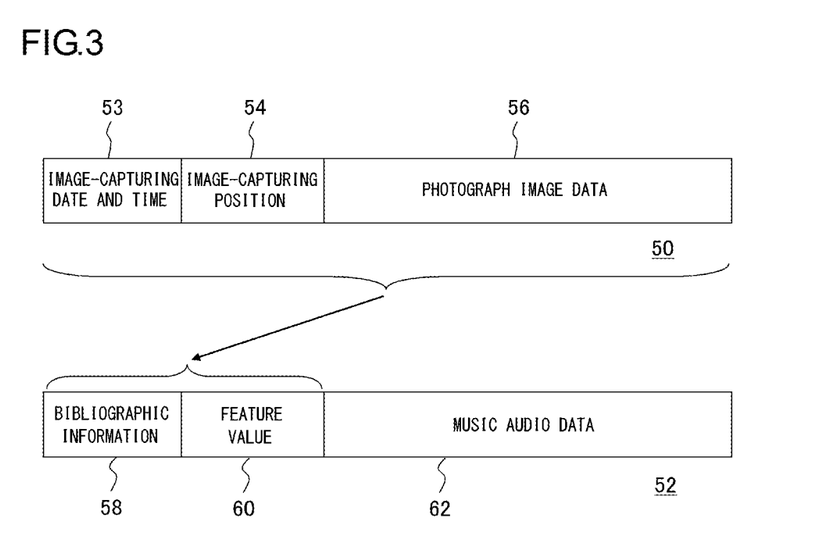
FIG. 3 is a diagram illustrating the respective configurations of photograph data and music data used in the embodiment.

FIG. 3 illustrates the respective configurations of photograph data and music data used in the embodiment. Photograph data 50 is constituted of photograph image data 56 accompanied by additional information: an image-capturing date and time 53; and an image-capturing position 54. Such additional information is also often added automatically in a commonly-used image-capturing device. In the embodiment, a feature of a photograph is identified using the image-capturing date and time 53, the image-capturing position 54, and the photograph image data 56. Meanwhile, music data 52 is constituted of music audio data 62 accompanied by additional information: bibliographic information 58; and a feature value 60.

As shown by an arrow in the figure in the embodiment, the photograph data 50 is converted into the bibliographic information 58 and the feature value 60 of the matching music data 52 using a feature of the photograph as a medium, and music is extracted based thereon. As previously described, the feature value 60 may not be directly added to the music audio data 62. It is only necessary to establish a database, which allows the music data 52 to be searched for based on the feature value 60, in the music data storage unit 22 of the information processing device 12 or the music data storage unit 28 of music data server 14.

Data that shows the activities of a recorder may be used as additional information at the same time the photograph data 50 is used. For example, the data that shows the activities of a recorder, i.e., activity information, is data in which time spent in a building, a facility, or the like and travel time are recorded along a time axis. This data is obtained by analyzing location history in which the location of the user is recorded at a predetermined interval using a GPS (Global Positioning System) or information from a communication base station. More specifically, history of velocity is generated based on a displacement in time in the location history, and a period, in which velocity is continued to be below a predetermined velocity threshold value for a predetermined time, is extracted as a period of stay. An interval between periods of stay is set to be a period of travel. Alternatively, for example, information recorded by hand by the user may be used.

Figure 4:
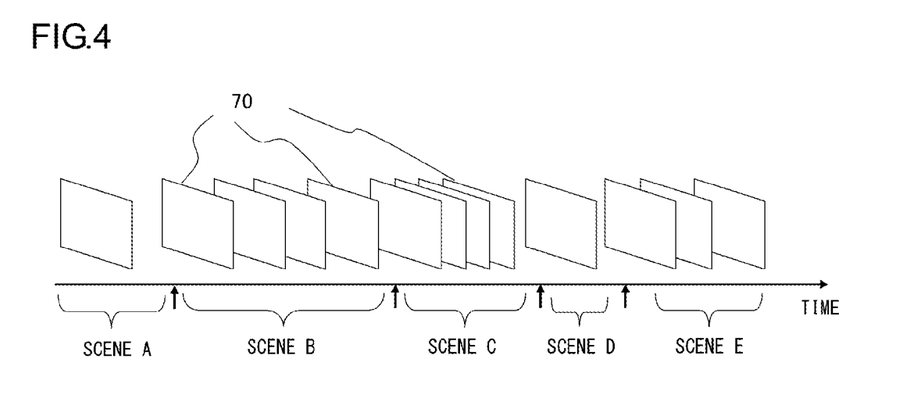
FIG. 4 is a conceptual diagram for a classification process when photograph data composed of data of a plurality of photographs is to be processed in the embodiment.

FIG. 4 shows a conceptual diagram for a classification process performed by the photograph classification unit 30 when the user specifies photograph data composed of data of a plurality of photographs to be processed. In the figure, a horizontal direction represents a time axis for an image-capturing time. Photographs 70 are lined up in chronological order of an image-capturing time along the time axis. The photograph classification unit 30 divides photographs into groups each of which is considered to be corresponding to each scene by providing a break such as those shown by arrows so as to classify the entire photographs.

Figure 5:
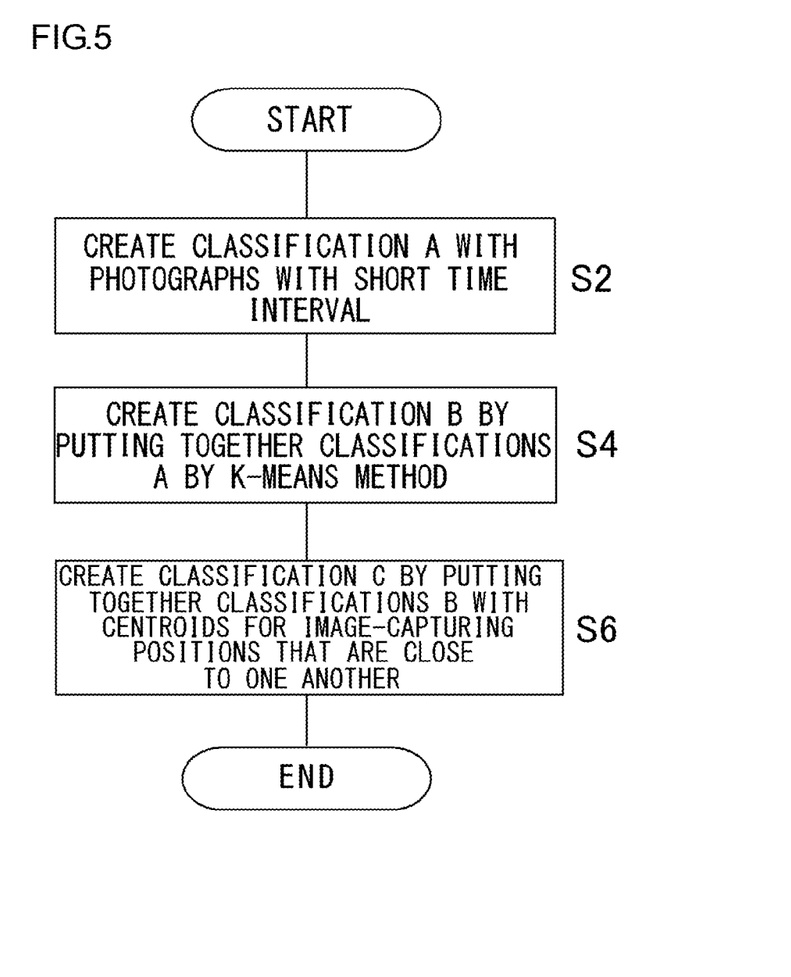
FIG. 5 is a flowchart illustrating a procedure for classifying a plurality of photographs in the embodiment.

Additional information such as the above-described period of stay and period of travel that is separate from photograph data may be used for this break. Meanwhile, if no such information is available, classification is performed as follows. FIG. 5 is a flowchart illustrating a procedure for classifying a plurality of photographs by the photograph classification unit 30. A classification A is created by grouping photographs with an image-capturing time interval that is shorter than a predetermined threshold value from among the original photograph group (S2). The classification A is a classification of a smallest unit where an almost identical composition is captured by continuous image capturing or the like. Thus, a threshold value at this time is set based on such a scale.

Classifications A are arranged in order based on a image-capturing time or image-capturing position. Then, a classification B is created by selecting k classifications A at even intervals and then by clustering the selected classifications A by the k-means method (S4). A classification C is created by combining classifications B having centroids of coordinates for respective image-capturing positions that are close to one another by less than a threshold value (S6). The classifications of the classification C thus created are considered to include a group of photographs captured at an almost identical location. Thus, the classification C is set to be a final classification, and recommendation of music is conducted in units of classifications C.

The described above is a method where photographs that are close to one another in consideration of both the image-capturing time and image-capturing position are put into the same classification. Alternatively, photographs captured within a predetermined threshold value of an image-capturing time from image capturing of one another or photographs whose image-capturing positions are within a predetermined range may be put together as a classification. When music is recommended based on a classification as described, respective values of various parameters described in the following explanation mean centroid values. When a plurality of classifications C are successive, these classifications may be combined into one classification as long as the number of photographs belonging to these classifications is smaller than a predetermined threshold value so as to perform a process for recommending music. These photograph classifications may be able to be edited later by the user.

Figure 6:
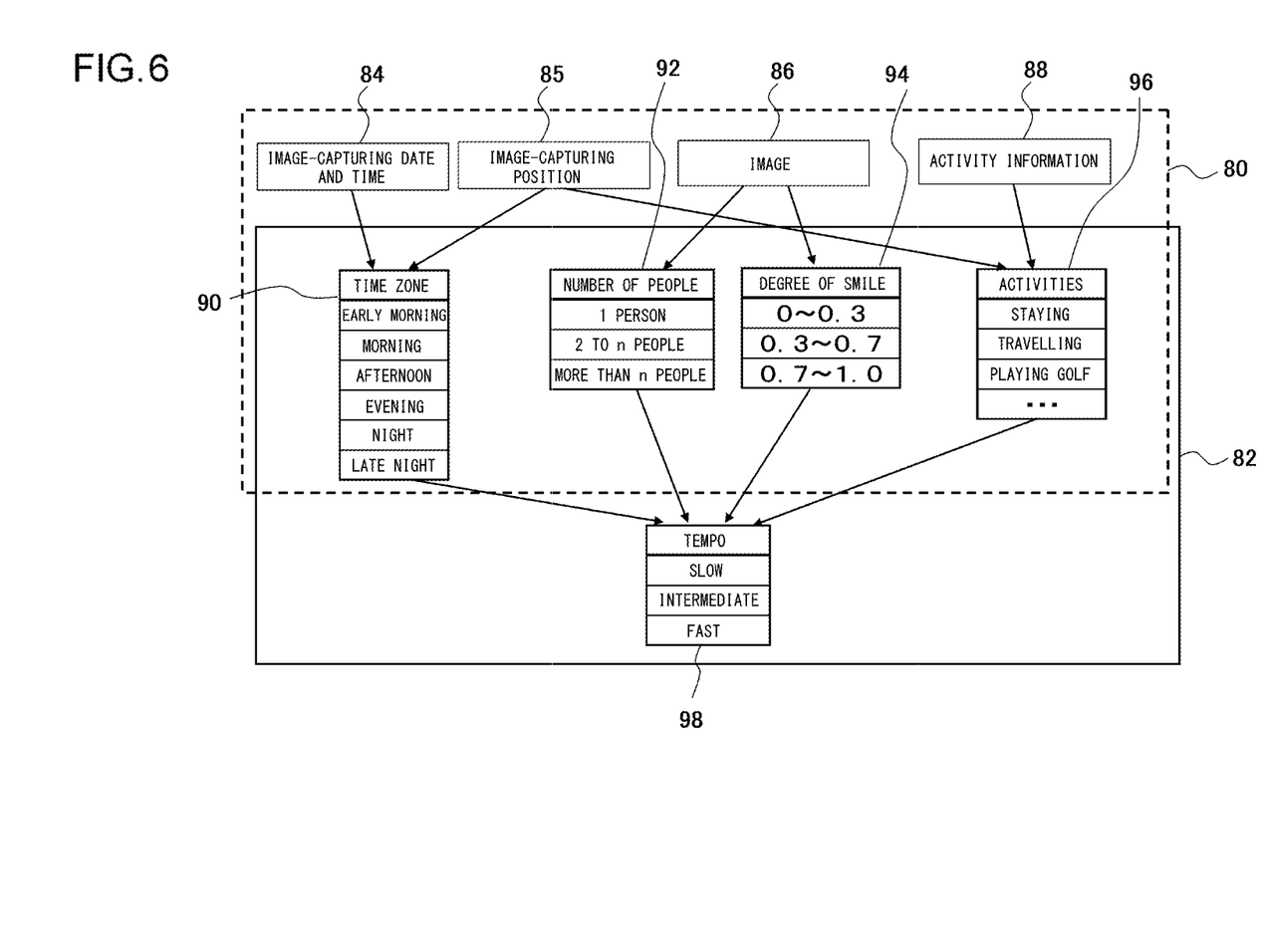
FIG. 6 is a diagram illustrating the flow of data associated with a tempo determination unit in the embodiment.

An explanation is now given of the flow of data processed by the photograph feature acquisition unit 32 and the music feature determination unit 34. FIG. 6 illustrates the flow of data associated with the tempo determination unit 46. In the figure, a dashed line 80 indicates a correspondence relationship described in a photograph-feature acquisition table referred to by the photograph feature acquisition unit 32, and a solid line 82 indicates a correspondence relationship described in a music-feature acquisition table referred to by the tempo determination unit 46. An image-capturing date and time 84, an image-capturing position 85, an image 86, and activity information 88 in the upper row are photograph data. The middle row shows a time-zone list 90, a head-count range list 92, a smile degree list 94, and an activity category list 96 that have been prepared in advance as the features of the photograph.

The photograph feature acquisition unit 32 acquires a corresponding time zone from the time-zone list 90 based on the image-capturing date and time 84 and the image-capturing position 85, which are additional information of the photograph data. The image-capturing position 85 is referred to, anticipating time correction in the case when the time set in an image-capturing device is not corrected to match the local time during a visit to a region with a time difference, as described above. The time zone may be acquired based only on the image-capturing date and time 84 in the case of a visit to a country without a time difference or in the case when the time set in the device is corrected. As the time-zone list 90, choices such as early morning, morning, afternoon, evening, night, and late night are prepared.

A commonly-used face recognition process is performed on an image 86 of each photograph. Then, whether or not there is a photograph in which the image of a person is captured and a ratio of a face in the image are derived, and a corresponding head-count range is then acquired from the head-count range list 92. As the head-count range list 92, choices such as one person, two to n people, and more than n people are prepared. The value of n may be a value registered by the user such as the number of family members. Storing the value of n in the user information storage unit 42 allows the photograph feature acquisition unit 32 to appropriately refer to the value of n. Alternatively, age composition patterns may be prepared as a list, and a pattern that matches the age composition of a person identified by the face recognition process may be selected.

Similarly, the degree of smile of an individual face is derived by a commonly-used facial-expression recognition process, and a corresponding range of a degree of smile is acquired from the smile degree list 94 by appropriately averaging the degree of smile. As the smile degree list 94, choices such as 0 to 0.3, 0.3 to 0.7, and 0.7 to 1.0 are prepared where 1.0 represents the maximum degree of smile. Other than a value of a degree of smile, a category for facial expressions such as a smiley face, an expressionless face, and a crying face or a category for attributes such as race, sex, and age may be used.

Furthermore, if the above-stated activity information 88 is used as additional information, an activity at the time of capturing the photograph is selected from the activity category list 96. The activity category list 96 prepares choices such as, e.g., staying and travelling in accordance with the format of the activity information 88. Determining whether the travelling is carried out by a vehicle or on foot based on the speed of the travelling allows a category for choices such as vehicle riding and walking to be prepared. A category for the activity may be selected based on the image-capturing position. For example, a feature of an image-capturing location such as a park, a golf course, a theme park, a school, and a mountain is identified based on an image-capturing position, and activities are prepared, which correspond to respective features, such as taking a walk, playing golf, having leisure, participating in a school event, and climbing a mountain.

In reference to the music-feature acquisition table, the tempo determination unit 46 determines a corresponding tempo from a tempo list 98 set for combinations of the respective features thus acquired. As the tempo list 98, choices such as slow, intermediate, and fast are prepared. Alternatively, a specific range of tempo values may be prepared. Parameters in FIG. 6 are for illustrative purposes. A tempo may be determined based on a part of the parameters or also in consideration of other features. For example, in a case of a photograph in which "people of more than the number of family members" are captured at "night," a tempo is set to be "fast" assuming a party situation.

Figure 7:
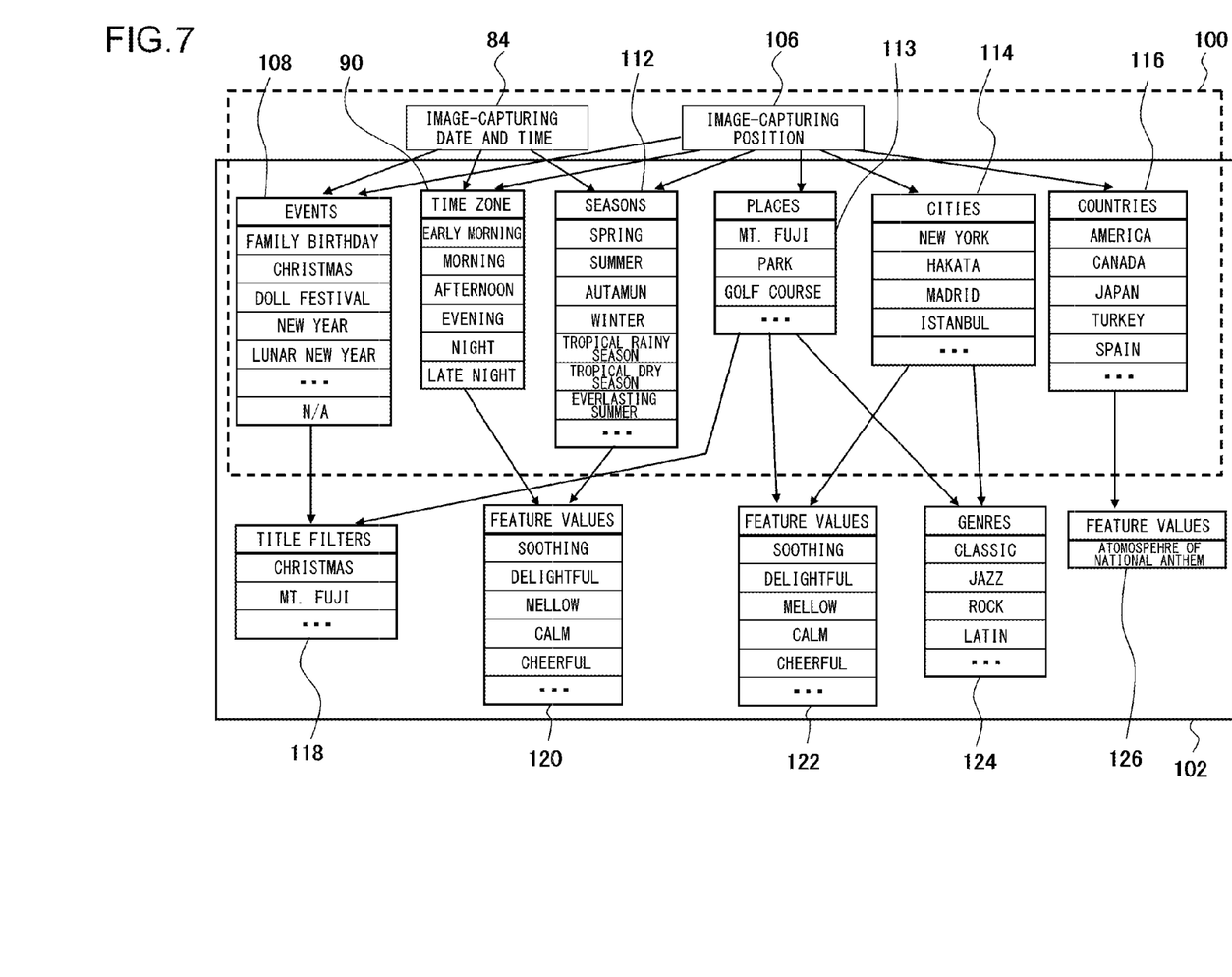
FIG. 7 is a diagram illustrating the flow of data associated with a melody determination unit in the embodiment.

FIG. 7 illustrates the flow of data associated with the melody determination unit 48. In the figure, a dashed line 100 indicates a correspondence relationship described in a photograph-feature acquisition table referred to by the photograph feature acquisition unit 32, and a solid line 102 indicates a correspondence relationship described in a music-feature acquisition table referred to by the melody determination unit 48. An image-capturing date and time 84 and an image-capturing position 106 in the upper row are photograph data. The middle row shows an event list 108, a time-zone list 90, a season list 112, a city-name list 114, and a country-name list 116 that have been prepared in advance as the features of the photograph. The lower row represents a feature-value lists 120 and 122, a genre list 124, and a feature value 126 of music associated to each classification of the features of a photograph.

The photograph feature acquisition unit 32 acquires a corresponding event, time zone, and the season from the event list 108, the time-zone list 90, and the season list 112, respectively, based on the image-capturing date and time 84 and the image-capturing position 106, which are additional information of the photograph data. As the event list 108, choices such as family anniversary (e.g., birthday, wedding anniversary, etc.), Christmas, Doll Festival, new year, and lunar new year are prepared. A family anniversary registered by the user in advance is stored in the user information storage unit 42 so as to be appropriately referred to by the photograph feature acquisition unit 32. The rest of the events vary depending on countries, as described above. Thus, the photograph feature acquisition unit 32 identifies a country based on the information regarding the image-capturing position 106 and switches the contents of the event list 108 based thereon.

The time-zone list 90 is similar to that explained in FIG. 6. As the season list 112, choices such as spring, summer, autumn, winter, tropical rainy season, tropical dry season, and everlasting summer are prepared. By taking into consideration the image-capturing position 106 in addition to the image-capturing date and time 84 at the stage of acquiring season, a regional difference in the season can be correctly reflected.

In the above photograph-feature acquisition, the melody determination unit 48 sets a title filter 118 if there is a corresponding event. This is a filter for extracting music whose title includes the name of a corresponding event. In other words, music with a title including "Christmas" or "new year" is recommended. Instead of a title, lyrics may be used. The information set by this filter is also included in features of the music. The melody determination unit 48 further acquires a corresponding feature value from the feature-value list 120 set for combinations of time zones and the season in the time-zone list 90 and the season list 112, respectively. As the feature-value list 120, choices such as soothing, delightful, mellow, calm, and cheerful are prepared.

As described above, a feature value set for the feature-value list 120 is determined according to the format of a search system of the music data storage unit 22 of the information processing device 12 or the music data storage unit 28 of the music data server 14, which is a database for determining specific recommended music afterward. In other words, a feature value does not need to be set for a list of words expressing the atmospheres of music listed in the feature-value list 120 in FIG. 7 and may be set for a rough list indicating whether the music is instrumental or vocal or indicating whether the voice is a male voice or a female voice or may be set for a list of identification numbers assigned to detailed classifications obtained as a result of evaluating music from various perspectives.

The photograph feature acquisition unit 32 further acquires a corresponding location, city name, or country name from a location list 113, the city-name list 114, and the country-name list 116, respectively, based on the image-capturing position 106, which is additional information of the photograph data. The name of a place prepared for the location list 113 may be a proper noun of a landmark or a place, such as Mt. Fuji, or may be a type name of a place or a facility such as a park and a golf course. For a city name prepared for the city-name list 114, the name of a city from around the world, such as New York, Hakata, Madrid, and Istanbul, can be set without particularly restricting a size or a position. However, it is desirable to register the name of a musically-distinct city. It is desirable to register at least the name of a country often visited by the general public in the country-name list 116.

If the name of a location corresponding to an image-capturing position is registered, the melody determination unit 48 acquires by the title filter 118 music having a title that includes the name of the location. The melody determination unit 48 further acquires a feature value and a genre that are set for the name of the location from the feature-value list 122 and the genre list 124, respectively. If the name of a city corresponding to the image-capturing position is registered, the melody determination unit 48 further acquires a feature value and a genre that are set for the name of the city from the feature-value list 122 and the genre list 124, respectively. In setting the feature-value list 122 and the genre list 124, e.g., representative music such as music of a genre originating from the city may be first prepared, and the same genre and feature value may be used for a setting value. Alternatively, a genre and a feature value that are associated to each location may be set. The same list as that of the feature-value list 120 is prepared for the feature-value list 122. As the genre list 124, choices such as classic, jazz, rock, and Latin are prepared according to each place or city.

The melody determination unit 48 sets as the feature value 126 the atmosphere of a national anthem of a country corresponding to the image-capturing position. In fact, a table storing a specific feature value that indicates the atmosphere of a national anthem is prepared separately. When a country is identified as a feature of a photograph, the feature may be integrated into a specific feature value such as "soothing" in reference to the table. Instead of the national anthem, representative music of the country may be used. Parameters in FIG. 7 are for illustrative purposes. For both a feature of a photograph and a feature of music, a part of the parameters may be used, or other parameters may be derived.

Figure 8:
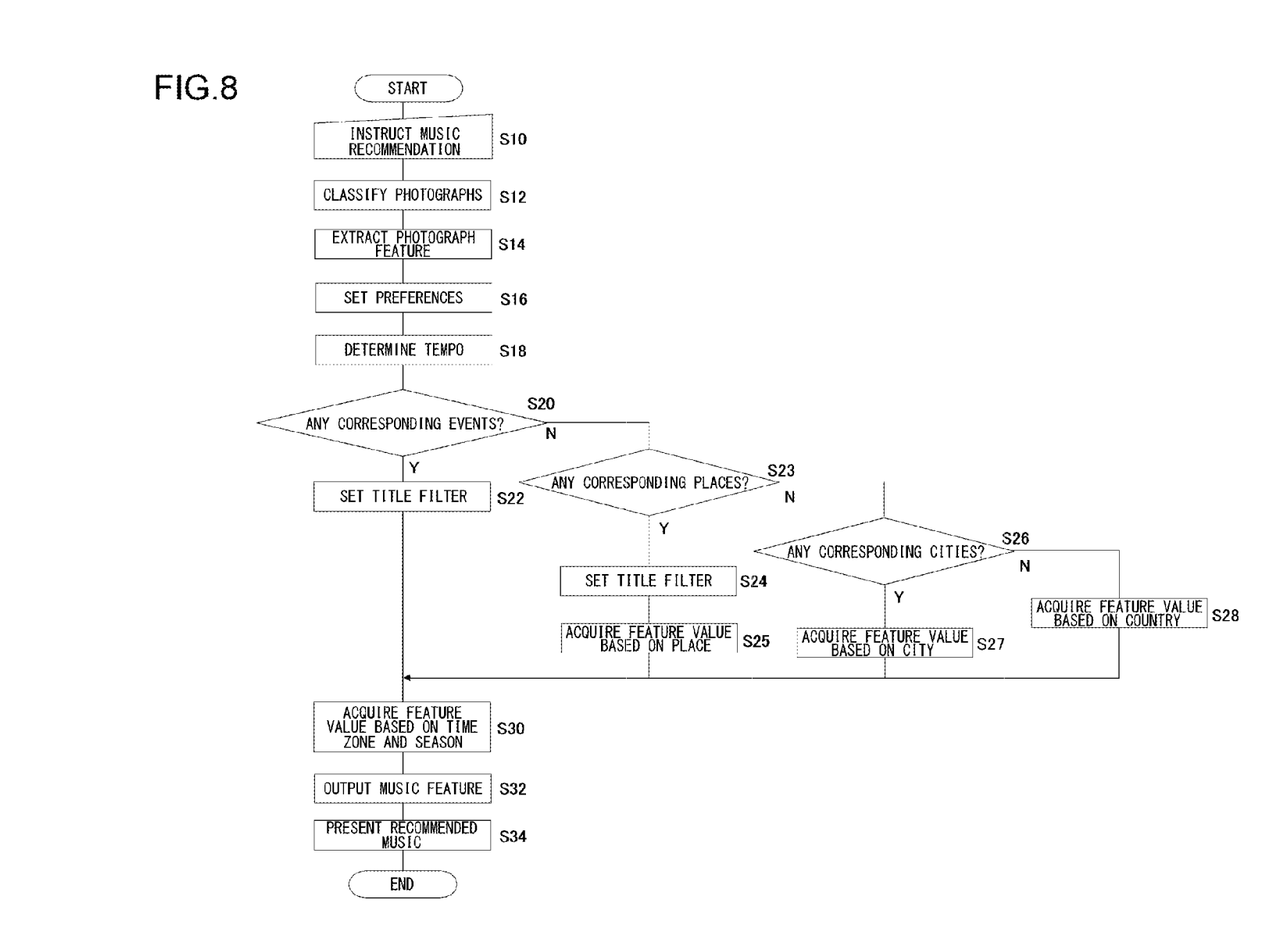
FIG. 8 is a flowchart illustrating a processing procedure for recommending music corresponding to a photograph in the embodiment.

A detailed description will now be made of the operation of the music recommendation system 10 that is realized by the configurations described thus far. FIG. 8 is a flowchart illustrating a processing procedure for recommending music corresponding to a photograph. When the user inputs to the information processing device 12 an instruction for recommending music by, e.g., specifying photograph data (S10), the photograph classification unit 30 classifies photographs if there are a plurality of photographs for recommendation of music for each scene (S12). The photograph feature acquisition unit 32 then refers to a photograph-feature acquisition table based on additional information of a photograph such as an image-capturing time and an image-capturing position and on a result of a face recognition process performed on an image so as to extract a feature of a photograph for each photograph or for each classification of photographs (S14).

The preference setting unit 45 of the music feature determination unit 34 then sets a preference of the user for a genre, an artist, etc., based on designation of the user at the time of a recommendation instruction or on information stored in the user information storage unit 42 (S16). The tempo determination unit 46 determines a tempo of the music in reference to a music-feature acquisition table based on features of the photograph such as a time zone of image capturing, the number of people captured in the photograph, the degree of smile, and an activity recorded along with the photograph (S18).

Then, when the photograph feature acquisition unit 32 detects registration of an event corresponding to the image-capturing date and time (Y in S20), the music feature determination unit 34 enables narrowing-down of available choices with use of a title by, e.g., setting the name of the event to a title filter (S22). If there is no corresponding event (N in S20) but a place corresponding to the image-capturing position is registered (Y in S23), narrowing-down of available choices with use of a title is enabled by, e.g., setting the name of the place to the title filter, and a feature value and a genre that are set to the corresponding place in the music-feature acquisition table are acquired (S24, S25).

If a place corresponding to the image-capturing position is not registered (N in S23) but the name of a city corresponding to the image-capturing position is registered (Y in S26), a feature value and a genre that are set to the city in the music-feature acquisition table are acquired (S27). If the corresponding name of the city is not registered (N in S26), a feature value such as a national anthem that is set to the music-feature acquisition table for a country corresponding to the image-capturing position is acquired (S28).

The melody determination unit 48 then acquires a feature value set to the music-feature acquisition table for the time zone or season of the image-capturing time (S30). The music-feature information determination unit 18 provides the music data output unit 20 the user's preference, the genre, and the feature value thus acquired as final features of the music (S32). If the process is performed on a plurality of classifications of photographs, the features of the music are arranged in the order that corresponds to the chronological order of respective image-capturing times, and the features are then provided in order. If features having successive values as feature values are employed, by, e.g., smoothing feature values for a plurality of scenes, the features of the music may be adjusted between the scenes.

If there are a plurality of acquired genres and feature values, the music-feature information determination unit 18 prepares in advance a rule for calculating final features such as setting priorities or calculating centroid values or center values. This rule depends on a method for music extraction performed by the music data output unit 20 of the information processing device 12 or the music data transmission unit 26 of the music data server 14 in a subsequent stage.

The music data output unit 20 of the information processing device 12 or the music data transmission unit 26 of the music data server 14 extracts corresponding music based on information regarding a feature of music acquired from the music-feature information determination unit 18 and presents the extracted music to the user as a recommended music (S34). If the music data server 14 performs the extraction process, the music data server 14 transmits and receives information to and from the music data output unit 20 of the information processing device 12 before and after the extraction process. It is ensured that the feature of the music used in S34 and music used in the end can be appropriately modified by the user.

Through procedures as those described above, a feature of music can be determined by making an association among photographs taken during a trip to Spain and France in summer time as follows: For photographs taken when travelling by a vehicle in the afternoon in Spain, the vehicle is associated with a fast tempo, Spain is associated with music similar to Spanish national anthem, and the afternoon in summer is associated with cheerful music. Meanwhile, for photographs taken at night in Marseille in France while not travelling, the non-travelling state is associated with an intermediate tempo, Marseille is associated with calm music, and a summer night is associated with hyped-up music.

According to the embodiment described above, for an image of, e.g., a photograph captured by the user, music with a matching atmosphere is extracted by using additional information, results of face recognition process and image analysis, activity information recorded concurrently with the photograph, etc. Taking into consideration an image-capturing position in addition to an image-capturing time as the additional information allows for music recommendation that takes account of a sense of the season, an event, history of music, an atmosphere, etc., that match a country or a region in which the image capturing occurred. Also, detailed changes in situations such as the number of people being captured, the degree of smile, a state of staying or travelling, and the like can be reflected in music to be recommended.

Further, by classifying for each scene a group of photographs captured in a long period of time such as during a trip and then extracting matching music for each scene, music that matches more a situation at the time of image capturing can be recommended. Since the embodiment can be realized using information recorded conventionally, the embodiment can be introduced easily and inexpensively.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

For example, music that matches the atmosphere of a photograph is recommended in the embodiment. However, a processing target does not need to be a photograph. For example, non-photographic image data such as a moving image like a recorded home video, computer graphics such as a screen shot stored during game play by a portable game device, and a computerized hand-drawn picture, text data of a memo, a poem, or the like, audio data, etc., can be processed in a similar manner using additional information thereof. The additional information may include information provided by the user afterward, in addition to information recorded at the same time the data is recoded.

DESCRIPTION OF THE REFERENCE NUMERALS 10 music recommendation system
12 information processing device
14 music data server
16 instruction input reception unit
18 music-feature information determination unit
20 music data output unit
22 music data storage unit
24 music feature reception unit
26 music data transmission unit
28 music data storage unit
30 photograph classification unit
32 photograph feature acquisition unit
34 music feature determination unit
38 photograph data storage unit
40 photograph-feature acquisition table storage
42 user information storage unit
44 music-feature acquisition table storage unit
45 preference setting unit
46 tempo determination unit
48 melody determination unit

INDUSTRIAL APPLICABILITY

As described above, the present invention is applicable to information processing devices such as computers, portable phones, digital cameras, video cameras, and the like.

The invention claimed is:

1. An information processing device comprising:
a content feature acquisition unit configured to acquire, based on additional information of content to be processed, a feature of the content;
a music feature determination unit configured to determine, in reference to a table prepared in advance associating the feature of the content with a feature of music, the feature of the music based on the feature of the content; and
a music data output unit configured to detect music that has the feature of the said music from a database and to present the information thereof as recommended music that matches the content,
wherein the content feature acquisition unit acquires, as the feature of the content,
a recording location based on information regarding a geographic position of recording of the content, and
a category for an activity occurred at the time of recording of the content based on information regarding a change in an activity of a content recorder,
wherein the music feature determination unit determines the feature of the music based on the recording location and the category for the activity.

2. The information processing device according to claim 1, further comprising:
a classification unit configured to classify a plurality of content items to be processed by putting together content items whose respective geographic recording positions are in a predetermined location range,
wherein the content feature acquisition unit acquires, for each classification, a centroid value or a center value of values representing the features of contents belonging to each classification, and
wherein the music feature determination unit determines a feature of music to be recommended for each classification in reference to the table based on the centroid value or the center value.

3. The information processing device according to claim 2, wherein the classification unit groups content items with a recording time interval smaller than a predetermined threshold value and then puts together, in unit of the group, content items whose respective geographic recording positions are in a predetermined location range.

4. The information processing device according to claim 1,
wherein the content feature acquisition unit acquires, as the feature of the content, the season in which recording occurred based on a recording geographic position and a recording date and time, and
wherein the music feature determination unit determines the feature of the music based on the season.

5. The information processing device according to claim 1,
wherein the content feature acquisition unit acquires, as the feature of the content, an event held on a day on which recording occurred based on a geographic recording position and a recording date and time, and
wherein the music feature determination unit determines to include, as a feature of music, the name of the event in any one of the following: a title, lyrics, and bibliographic information.

6. The information processing device according to claim 1, wherein the music feature determination unit determines the feature of the music from at least any one of the following: the name of a place, the type of recording facility, and the city, the region, and the country to which the recording location belongs.

7. The information processing device according to claim 1,
wherein the content feature acquisition unit further acquires, by performing a face recognition process on an image serving as content to be processed, at least any one of the following as the feature of the content: the number of people existing in the image, the facial expression of the people, and attribute information of the people, and
wherein the music feature determination unit determines the feature of the music from at least any one of the following: the acquired number of the people, the acquired facial expression of the people, and the acquired attribute information of the people.

8. The information processing device according to claim 1,
wherein the content feature acquisition unit further acquires, by performing an image analysis process on an image serving as content to be processed, at least any one of the following as the feature of the content: the brightness distribution, color distribution, and frequency characteristics of the image, and
wherein the music feature determination unit determines the feature of the music from at least any one of the following: the acquired brightness distribution, the acquired color distribution, and the acquired frequency characteristics.

9. The information processing device according to claim 1,
wherein the content feature acquisition unit identifies a transportation means for a person who records the content by obtaining the speed of travelling based on position history, in which the position of the person is recorded at a predetermined interval, acquired as additional information of the content, and
wherein the music feature determination unit determines the feature of the music based on the transportation means.

10. The information processing device according to claim 1,
wherein the content feature acquisition unit acquires, as the feature of the content, information regarding an actual climate value that corresponds to a geographic recording position and recording date and time of the content from a server connected via a network, and
wherein the music feature determination unit determines the feature of the music based on the actual climate value.

11. A music recommendation system for acquiring information pertaining to recommended music from a server via a network in an information processing device,
wherein the information processing device comprises:
a content feature acquisition unit configured to acquire, based on additional information of content to be processed, a feature of the content;
a music feature determination unit configured to determine, in reference to a table prepared in advance associating the feature of the content with a feature of music, the feature of the music based on the feature of the content; and
a music data output unit configured to transmit the feature of the music to the server so as to request recommendation of music that matches the content and to acquire information pertaining to recommended music from the server so as to present the acquired information,
wherein the server comprises:
a music data output unit configured to detect, from a database, music that has the feature of the music transmitted from the information processing device and to transmit the information thereof as recommended music to the information processing device,
wherein the content feature acquisition unit acquires, as the feature of the content, a recording location based on information regarding a geographic recording position of the content, and
wherein the music feature determination unit determines the feature of the music based on the recording location, and further
wherein the music feature determination unit determines the feature of the music from at least any one of the following: the name of a place, the type of recording facility, and the city, the region, and the country to which the recording location belongs.

12. An information processing method comprising:
reading out additional information of content to be processed and then acquiring a feature of the content based on additional information;
determining, in reference to a table prepared in advance associating the feature of the content with a feature of music, the feature of the music based on the feature of the content; and
detecting music that has the feature of said music from a database and then presenting the information thereof as recommended music that matches the content,
wherein, in the acquiring of the feature of the content, a recording location is acquired based on information regarding a geographic recording position as the feature of the content and a season in which recording occurred based on kite recording geographic position and a recording date and time, and
wherein, in the determining of the feature of the music, the feature of the music is determined based on the recording location and the season.

13. A non-transitory computer-readable recording medium having embodied thereon a computer program product comprising:
a module configured to read out additional information of content to be processed and then to acquire a feature of the content based on additional information;
a module configured to determine, in reference to a table prepared in advance associating the feature of the content with a feature of music, the feature of the music based on the feature of the content; and a module configured to detect music that has the feature of said music from a database and then to present the information thereof as recommended music that matches the content, wherein the module configured to acquire the feature of the content acquires a recording location based on information regarding a geographic recording position as the feature of the content and an event held on a day on which recording occurred based on the geographic recording position and a recording date and time, and wherein the module configured to determine the feature of the music determines the feature of the music based on the recording location and any one of the following: a title, lyrics, and bibliographic information.

* * * * *